(12) United States Patent
Adhikari

(10) Patent No.: US 7,778,936 B2
(45) Date of Patent: Aug. 17, 2010

(54) BUSINESS VALUATION SYSTEM AND METHOD

(75) Inventor: Manoj C. Adhikari, Lake Zurich, IL (US)

(73) Assignee: Adhikari Technology, Inc., Lake Zurich, IL (US)

( * ) Notice: Subject to any disclaimer, the term of this patent is extended or adjusted under 35 U.S.C. 154(b) by 1866 days.

(21) Appl. No.: 10/483,949

(22) PCT Filed: Jul. 19, 2002

(86) PCT No.: PCT/US02/23036
§ 371 (c)(1), (2), (4) Date: Jan. 15, 2004

(87) PCT Pub. No.: WO03/009104
PCT Pub. Date: Jan. 30, 2003

(65) Prior Publication Data
US 2004/0158479 A1  Aug. 12, 2004

Related U.S. Application Data

(60) Provisional application No. 60/306,630, filed on Jul. 19, 2001.

(51) Int. Cl.
*G06Q 20/00* (2006.01)

(52) U.S. Cl. .............................. 705/76; 705/1; 705/36; 705/51; 705/64; 380/4; 380/24; 380/25

(58) Field of Classification Search ............... 705/1–79; 380/4, 24, 25
See application file for complete search history.

(56) References Cited

U.S. PATENT DOCUMENTS

| | | | | |
|---|---|---|---|---|
| 5,930,762 | A | * | 7/1999 | Masch ............................ 705/7 |
| 6,078,904 | A | * | 6/2000 | Rebane ...................... 705/36 R |
| 6,119,107 | A | | 9/2000 | Polk |
| 6,173,276 | B1 | | 1/2001 | Kant et al. |
| 6,219,649 | B1 | | 4/2001 | Jameson |

\* cited by examiner

*Primary Examiner*—Pierre Eddy Elisca
*Assistant Examiner*—Shahid Kamal
(74) *Attorney, Agent, or Firm*—Wood, Phillips, Katz, Clark & Mortimer

(57) ABSTRACT

The present method and system relates to processor-based valuations of an entity, such as a business, comprising a best value mode for iteratively generating optimized input elements and calculating an output data set from the optimized input elements that meet the conditions of the parties interested in the valuation, an interactive mode enabling a user to modify the input elements to determine how the modified elements affect the financial output of the valuation, and a module enabling the user to switch between the best value and interactive modes.

2 Claims, 17 Drawing Sheets

FIG. 4B

FUTURE GROWTH AND EXPENSES — 68

110 — SALES & EBITDA GROWTH PER YR  [5] %
114 — CAP EXP [% OF EBITDA] PER YR  [10] %   — 112
       EBITDA-SYNERGY  [0] %

SUMMARY - OVERVIEW

62
BEST VALUE — 136

150 — PRICE MULTIPLE  [4.03] EBITDA
                       4.48  EBIT
       CASH DOWN PAYMENT  75.7 %
       GAP [SELLER] FUNDING TOTAL  [24.3] %
       STOCK VS. ASSET PURCHASE  ASSET

BUSINESS VALUE $       [3026]  — 168
CASH DOWN PAYMENT $     2292
GAP [SELLER] NOTE $      734
GAP [SELLER] BALLON NOTE $  0
GAP [SELLER] NON-COMPETE $  0
REMAINING CONSULTING $      0
TOTAL GAP [SELLER] FINANCING  [734]

BUYER EQUITY $           [712]  23.5%
BUYER'S PRE-TAX ROI       35.0 %  — 170
GOODWILL $                826
TOTAL BUYER CAPITAL $     713
BUSINESS BANK LOAN $     1640
MEZZANINE LOAN EQUITY %  [N/A]
REAL ESTATE PRICE $         0
RE EQUITY $                 0
RE BANK LOAN $              0
RE ROI [%]                0.0

|                  | YEAR1 | YEAR2 | YEAR3 | YEAR4 | YEAR5 |
|------------------|-------|-------|-------|-------|-------|
| BVX CASH FLOW    | 0     | 60    | 93    | 129   | 169   |
| ADD'L REVOLVER   | 42    | 0     | 0     | 0     | 0     |
| TAXABLE INCOME   | 261   | 308   | 365   | 427   | 495   |

BVX Business ValueXpress TM [New Valuation] — 204

FILE  VIEW  TOOLS  HELP

| OVER VIEW | INCOME STMT | CASH FLOW | BALANCE SHEET | BUYER ROI | OTHER CALCULATIONS |

— 184, 186, 188, 190, 192

INCOME STATEMENT (PRE-ACQUISITION)

| | |
|---|---|
| SALES | 5000 |
| EBITDA TO DISCRETIONARY CF | 750 |
| LESS ADDITIONAL SALARIES EXPENSES | 0 |
| LESS RENT NOT DEDUCTED | 0 |
| ADJ EBITDA | 750 |
| EBITDA MARGIN (%) | 15.00 |

BALANCE SHEET (ACQUIRED)

| | |
|---|---|
| OPERATING CASH | 0 |
| FIXED ASSETS BOOK VALUE | 500 |
| FIXED ASSETS FAIR MARKET VALUE [FMV] | 1000 |
| 96 — ACCOUNTS RECEIVABLE [A/R] | 600 |
| 100 — INVENTORY | 900 |
| OTHER MISC ASSETS | 0 |
| 108 — A/P | 300 |
| OTHER MISC LIABILITIES | 0 |
| NET ASSETS ACQD @ BOOK VALUE | 1700 |

FINANCING

| | ADV RATE | INTREST % | YEARS | |
|---|---|---|---|---|
| REVOLVER % OF A/R | 80 | 10 | | REVOLVER |
| REVOLVER % OF INVENTORY | 40 | 10 | | REVOLVER |
| TERMINATION % OF FMV OF FA | 80 | 10 | 5 | YEARS |
| CAP EX LOAN % ON CAP EX | 75 | 10 | 5 | YEARS |
| OPEN REVOLVE CREDIT FACILITY | YES | | | |
| BUYER EQUITY (% OF PRICE) | 23.5 | | | |
| BUYER EXPECTED ROI | 35.00 | | | |

FINANCING

| | AMOUNTS | INTEREST % | YEARS |
|---|---|---|---|
| GAP SELLER NOTE | YES | 10 | 5 |
| NON-COMPETE AMOUNT | 0 | 10 | 5 |
| TOTAL CONSULTING | 0 | | 5 |
| PREPAID CONSULTING | 0 | REMAINING CONSULT 0 | |
| STOCK OF ASSET PURCHASE | ASSET | | |
| PURCHASE PRICE MULTIPLE | 4.03 | | |

MISCELLANEOUS

| | | |
|---|---|---|
| CASH RESERVE @YE (% EBITDA) | 10 @ | 3 % INT. ON CASH |
| DIVIDEND DISTRIBUTER | 0 | % AFTER DEBT + TAXES |
| ACQUISTION EXPENSE | 2 | % OF PURCHASE PRICE |
| CLOSING COST AT EXT | 5 | % OF SELLING PRICE |
| OLD FIXED ASSETS WRITE OFF | 5 | YEARS |
| NEW FIXED ASSETS WRITE OFF | 5 | YEARS |
| EXT EBITDA MULTIPLE | PM | MAX EXIT MULTIPLE 10 |

ENTER PM CLICK MULTIPLE PURCHASE MULTIPLE

TAXATION

| | | |
|---|---|---|
| BUYER'S CORPORATION TYPE | S.CORP | |
| S.SHRLD TAX RATE FED+STATE | 40 | |
| S.CORP TAX RATE: STATE | 3 | |

ADVANCED FEATURES

AMOUNTS, INTEREST %, YEARS

FUTURE GROWTH AND EXPENSES

SALES & EBITDA GROWTH PER YR  [50] %
CAP EXP [% OF EBITDA] PER YR  [10] %
EBITDA-SYNERGY  [0] %

PRICE MULTIPLE  [15.11]  EBITDA
                 16.79   EBIT
CASH DOWN PAYMENT  99.9 %
GAP[SELLER] FUNDING TOTAL  [0.1] %
STOCK VS. ASSET PURCHASE  ASSET

| | YEAR1 | YEAR2 | YEAR3 | YEAR4 | YEAR5 |
|---|---|---|---|---|---|
| BVX CASH FLOW | 0 | 64 | 44 | 8 | 0 |
| ADDL REVOLVER | 0 | 0 | 0 | 0 | 52 |
| TAXABLE INCOME | 75 | 612 | 1415 | 2607 | 4384 |

SUMMARY - OVERVIEW

[NO SOLUTION] — 200

[BEST VALUE]

BUSSINESS VALUE $  [11332]   11321
CASH DOWN PAYMENT $           12
GAP [SELLER] NOTE $            0
GAP [SELLER] BALLON NOTE $     0
GAP [SELLER] NON-COMPETE $     0
REMAINING CONSULTING $         0
TOTAL GAP [SELLER] FINANCING  [12]

BUYER EQUITY $  [9908]  87.4%
BUYER PRE-TAX ROI       52.0 %
GOODWILL $              9132
TOTAL BUYER CAPITAL $   9908
BUSINESS BANK LOAN $    1640
MEZZANINE LOAN EQUITY %  [N/A]
REAL ESTATE PRICE $      0
RE EQUITY $              0
RE BANK LOAN $           0

RE ROI [%]              0.0

FIG. 6B

| INCOME STATEMENT | YEAR 0 | YEAR 1 | YEAR 2 | YEAR 3 | YEAR 4 | YEAR 5 |
|---|---|---|---|---|---|---|
| SALES | 5000.0 | 5250.0 | 5512.5 | 5788.1 | 6077.5 | 6381.4 |
| GROWTH% | | 5.0% | 5.0% | 5.0% | 5.0% | 5.0% |
| EBITDA | 750.0 | 787.5 | 826.9 | 888.2 | 911.6 | 957.2 |
| | 15.0% | 15.0% | 15.0% | 15.0% | 15.0% | 15.0% |
| OTHER EXPENSES | | | | | | |
| INTEREST EXP- REVOLVER | | 84.0 | 88.2 | 82.2 | 72.9 | 60.0 |
| INTEREST EXP. TERM LOAN | | 80.0 | 64.0 | 48.0 | 32.0 | 16.0 |
| INTEREST EXP- OVER ADVANCE LOAN | | 0.0 | 0.0 | 0.0 | 0.0 | 0.0 |
| INTEREST EXP: MEZZANINE LOAN | | 0.0 | 0.0 | 0.0 | 0.0 | 0.0 |
| INTEREST EXP: CAP EXP LOAN | | 5.9 | 10.9 | 15.0 | 18.1 | 20.2 |
| INTEREST EXP GAP(SELLER) NOTE | | 73.4 | 58.7 | 44.1 | 29.4 | 14.7 |
| INTEREST EXP GAP(SELLER) BALLOON NOTE | | 0.0 | 0.0 | 0.0 | 0.0 | 0.0 |
| INTEREST EXP: NON COMPETE | | 0.0 | 0.0 | 0.0 | 0.0 | 0.0 |
| INTEREST INC ON CASH | | 0.0 | 2.4 | 2.5 | 2.6 | 2.7 |
| DEPRECIATION | | 215.8 | 232.3 | 249.7 | 267.9 | 287.0 |
| NON-COMPETE AMORT | | 0.0 | 0.0 | 0.0 | 0.0 | 0.0 |
| REMAINING CONSULTING PAYMENTS | | 0.0 | 0.0 | 0.0 | 0.0 | 0.0 |
| PREPAID CONSULTING AMORTIZATION | | 0.0 | 0.0 | 0.0 | 0.0 | 0.0 |
| ACQUISITION COST AMORT | | 12.1 | 12.1 | 12.1 | 12.1 | 12.1 |
| GOODWILL AMORT-15YRS(TAX DEDUCTIBLE) | | 55.1 | 55.1 | 55.1 | 55.1 | 55.1 |
| TOTAL OTHER EXPENSES | | 526.3 | 519.0 | 503.6 | 484.9 | 462.4 |
| TAXABLE INCOME | | 261.2 | 307.9 | 364.5 | 426.7 | 494.8 |
| CORP TAXES STATES | | 7.8 | 9.2 | 10.9 | 128 | 14.8 |
| CORP TAXES FEDERAL | | 0.0 | 0.0 | 0.0 | 0.0 | 0.0 |
| NET INCOME | | 253.4 | 298.6 | 353.6 | 413.9 | 480.0 |

*FIG. 7*

| | | | | | |
|---|---|---|---|---|---|
| CASH SURPLUS/DEFICIT | | | | | |
| BEGINNING CASH BALANCE | 0.0 | 78.8 | 82.7 | 85.8 | 91.2 |
| OPERATION CASH FLOW | 36.6 | 63.9 | 97.1 | 133.4 | 173.2 |
| OPERATION CASH REQUIREMENTS | 0.0 | 0.0 | 0.0 | 0.0 | 0.0 |
| CASH RESERVE @ YEAR END | 78.8 | 82.7 | 86.8 | 91.2 | 95.7 |
| CASH SURPLUS/DEFICIT B4 NEW BORROWING | 42.1 | 60.0 | 93.0 | 129.1 | 168.7 |
| AVAILABILITY CREDIT LINE | 42.0 | 44.1 | 150.4 | 292.0 | 472.1 |
| NEW BORROWING | 42.0 | 0.0 | 0.0 | 0.0 | 0.0 |
| | -0.1 | 60.0 | 93.0 | 129.1 | 168.7 |
| BVX CASH FLOW | 0.1 | 0.0 | 0.0 | 0.0 | 0.0 |
| ADD'L CAPITAL CONTRIBUTION | 0.0 | 0.0 | 0.0 | 0.0 | 0.0 |
| DIVIDEND DISTRIBUTION | 0.0 | 0.0 | 0.0 | 0.0 | 0.0 |
| ADD'L OVER ADVANCE LOAN PAYDOWN | 0.0 | -60 | -93.0 | -129.1 | -168.7 |
| ADD'L REVOLVER PAYDOWN | 0.0 | 0.0 | 0.0 | 0.0 | 0.0 |
| ADD'L TERM LOAN PAYDOWN | 0.0 | 0.0 | 0.0 | 0.0 | 0.0 |
| ADD'L NEW CAP EXPAYDOWN | 0.0 | 0.0 | 0.0 | 0.0 | 0.0 |
| ADD'L CAP (SELLER) NOTE PAYDOWN | 0.1 | 60.0 | 93.0 | 129.1 | 168.7 |
| ADD'L CONTRIBUTION/DISTRIBUTION | | | | | |
| CHANGE IN CASH | 78.8 | 3.9 | 4.1 | 4.3 | 4.6 |

*FIG. 8B*

| BALANCE SHEET | PURCHASED | OPENING | YEAR 1 | YEAR 2 | YEAR 3 | YEAR 4 | YEAR 5 |
|---|---|---|---|---|---|---|---|
| ASSETS | | | | | | | |
| CASH | 0.0 | 0.0 | 78.8 | 82.7 | 86.6 | 91.2 | 95.7 |
| A/R | 600.0 | 600.0 | 630.0 | 661.5 | 694.6 | 729.3 | 765.8 |
| INVENTORY | 900.0 | 900.0 | 945.0 | 992.3 | 1041.9 | 1094.0 | 1148.7 |
| OTHER MISC ASSETS | 0.0 | 0.0 | 0.0 | 0.0 | 0.0 | 0.0 | 0.0 |
| FIXED ASSETS, OLD | 500.0 | 1000.0 | 1000.0 | 1000.0 | 1000.0 | 1000.0 | 1000.0 |
| A/D, OLD | | 0.0 | -200.0 | -400.0 | -600.0 | -800.0 | -1000.0 |
| NEW FXD ASSETS | | 0.0 | 78.8 | 161.4 | 248.3 | 339.4 | 435.1 |
| A/D- NEW FXD ASSETS | | 0.0 | -15.8 | -48.0 | -97.7 | -165.6 | -252.6 |
| ACQUISITION EXPENSES | | 60.5 | 48.4 | 36.3 | 24.2 | 12.1 | 0.0 |
| NON-COMPETE AGREEMENT | | 0.0 | 0.0 | 0.0 | 0.0 | 0.0 | 0.0 |
| REMAINING CONSULTING | | 0.0 | 0.0 | 0.0 | 0.0 | 0.0 | 0.0 |
| PREPAID CONSULTING | | 0.0 | 0.0 | 0.0 | 0.0 | 0.0 | 0.0 |
| INVESTMENT IN RE ENTITY | | 0.0 | 0.0 | 0.0 | 0.0 | 0.0 | 0.0 |
| GOOD WILL | 0.0 | 826.5 | 771.4 | 716.3 | 661.2 | 606.1 | 551.0 |
| TOTAL ASSETS | 2000.0 | 3387.0 | 3336.6 | 3202.5 | 3059.3 | 2906.5 | 2743.7 |

*FIG. 9A*

| LIABILITIES EQUITY | | | | | | |
|---|---|---|---|---|---|---|
| A/P & ACCURED | 300.0 | 300.0 | 315.0 | 330.8 | 347.3 | 364.7 | 382.9 |
| OTHER MISC LIABILITIES | 0.0 | 0.0 | 0.0 | 0.0 | 0.0 | 0.0 | 0.0 |
| REVOLVER | | 840.0 | 882.0 | 822.0 | 728.0 | 599.9 | 431.3 |
| TERM LOAN | | 800.0 | 640.0 | 480.0 | 320.0 | 160.0 | 0.0 |
| OVER ADVANCE LOAN | | 0.0 | 0.0 | 0.0 | 0.0 | 0.0 | 0.0 |
| MEZZANINE LOAN | | 0.0 | 0.0 | 0.0 | 0.0 | 0.0 | 0.0 |
| GAP (SELLER) NOTE | | 734.2 | 597.4 | 440.5 | 293.7 | 146.8 | 0.0 |
| GAP (SELLER) BALLOON NOTE | | 0.0 | 0.0 | 0.0 | 0.0 | 0.0 | 0.0 |
| GAP EX LOAN | | 0.0 | 47.3 | 85.1 | 112.9 | 130.4 | 136.9 |
| REMAINING NON-COMPLETE PAYMENTS | | 0.0 | 0.0 | 0.0 | 0.0 | 0.0 | 0.0 |
| REMAINING CONSULTING PAYMENTS | | 0.0 | 0.0 | 0.0 | 0.0 | 0.0 | 0.0 |
| NON-OPERATING LIAB. | | 2374.2 | 2156.6 | 1827.6 | 1455.7 | 1037.2 | 568.2 |
| RETAINED EARNING | 0.0 | 0.0 | 253.4 | 552.0 | 905.6 | 1319.6 | 1799.6 |
| ADDITIONAL CAPITAL | | 0.0 | 0.1 | 0.1 | 0.1 | 0.1 | 0.1 |
| DISTRIBUTION FOR TAXES | | 0.0 | -101.4 | -220.8 | -362.3 | 527.8 | -719.8 |
| DIVIDENDS | | 0.0 | 0.0 | 0.0 | 0.0 | 0.0 | 0.0 |
| COMMON STOCK | 1700.0 | 712.8 | 712.8 | 712.8 | 712.8 | 712.8 | 712.8 |
| EQUITY | 1700.0 | 712.8 | 864.9 | 1044.1 | 1256.3 | 1504.7 | 1792.6 |
| TOTAL LIAB & EQUITY | 2000.0 | 3387.0 | 3336.6 | 3202.5 | 3059.3 | 2906.5 | 2743.7 |

*FIG. 9B*

BVX BUSINESS VALUEXPRESS™ [C:\PROGRAM FILES\BUSINESS VALUEXPRESS\GRABULE INC.BVX]-[OTHER CALCULATION]

FILE  VIEW  TOOLS  HELP

OVERVIEW | INCOME STMT | CASH FLOW | BALANCE SHEET | BUYER ROI | OTHER CALCULATIONS

BANK LOAN DETAILS

| | |
|---|---|
| REVOLVER % OF A/R | 480.0 |
| REVOLVER % OF INVENTORY | 360.0 |
| TERM LOAN % OF FMV OF FA | 800.0 |
| OVER ADVANCE LOAN | 0.0 |
| GAP (SELLER) BALLOON NOTE | 0.0 |
| MEZZANINE LOAN | 0.0 |
| BUSINESS BANK LOAN | 1640.0 |
| RE LOAN | 0.0 |
| TOTAL BANK LOAN | 1640.0 |

SOURCES OF FUNDS

| | |
|---|---|
| BUSINESS BANK LOAN | 1640.0 |
| BUYER EQUITY | 712.8 |
| GAP (SELLER) NOTE | 734.2 |
| GAP (SELLER) BALLOON NOTE | 0.0 |
| REMAINING NON-COMPETE | 0.0 |
| REMAINING CONSULTING (PV*) | 0.0 |
| TOTAL SOURCE OF FUNDS | 3087.0 |
| ASSUMED LIABILITIES | 300.0 |
| PRIOR RETAINED EARNINGS | |
| TOTAL CONSIDERATION | 3387.0 |

USES OF FUNDS

| | |
|---|---|
| CASH DOWN PAYMENT | 2292.3 |
| GAP (SELLER) NOTE | 734.2 |
| GAP (SELLER) BALLOON NOTE | 0.0 |
| REMAINING NON-COMPETE | 0.0 |
| REMAINING CONSULTING (PV*) | 0.0 |
| PURCHASE PRICES | 3026.5 |
| ACQUISITION EXPENSES | 60.5 |
| USE OF FUNDS | 3087.0 |

PRESENT VALUE (PV) OF REMAINING CONSULTING IS CALCULATED AT 8%

PURCH. PRICE ALLOCATION

| | |
|---|---|
| TANGIBLE ASSETS | 2500.0 |
| ACQUISITION EXPENSES | 60.5 |
| NON-COMPLETE | 0.0 |
| PREPAID CONSULTING | 0.0 |
| REMAINING CONSULTING (PV*) | 0.0 |
| GOODWILL | 826.5 |
| TOTAL CONSIDERATION | 3387.0 |
| CONSULTING DIFFERENCE # (TOTAL - PV) | 0.0 |
| TOTAL CONSIDERATION BALANCE SHEET | 3387.0 |

MORE CALCULATIONS

| FIN. RATIOS | REAL ESTATE FIN |
|---|---|
| DEPRECIATION | |

FIG. 11

BUSINESS VALUATION SYSTEM AND METHOD

PRIORITY CLAIM

This application claims the benefit of International Patent Application No. PCT/US02/23036 filed Jul. 19, 2002, and claims priority to U.S. provisional patent application Ser. No. 60/306,630 entitled Business Valuation System and Method filed on Jul. 19, 2001.

FIELD OF INVENTION

The present invention relates to business valuation methods and systems for calculating business valuations and more specifically to the use of an iterative process to generate a maximum business value that satisfies conditions and requirements of all parties interested in the valuation.

BACKGROUND OF THE INVENTION

Current techniques for valuing an entity, such as a business, consider the numerous factors associated with the entity to calculate its value. Business valuation techniques are commonly used by accountants, appraisers, attorneys, bankers, brokers, mergers and acquisitions advisors, valuation firms, buyers and sellers to determine market value of the entity. Business valuation techniques may also be used as tools to aid a business owner in maximizing shareholder value.

There are many methods of business valuation currently used. However, these methods produce business valuation results with a wide range of market values. It is not unusual to observe a 3:1 or 5:1 difference between the high and low values generated by the various methods. Each method considers different variables and factors and associates the variables to one another in a variety of ways. This leads to vastly different business valuations that can be generated with a subjective bias and to serve the varying interests of the parties involved in the transaction. Additionally, traditional valuation methods do not adequately address deal structures.

Traditional business methods fall into one of three categories: (1) asset based valuation; (2) market comparable valuations; and (3) earnings based valuations. According to asset based valuation methods, the value of the business is equal to the value of the business's assets. These methods can produce a multitude of results because the book value, adjusted book value, fair market value or liquidation value of the assets all may be used in the calculation.

According to market based evaluation methods, the value of the business is equal to a multiple of a business parameter. The multiples are derived from actual transaction data from similar businesses. The most common business parameter used is earnings. However, for non-publicly traded companies, there are numerous definitions of earnings including actual earnings or adjusted earnings, earnings before the business owner's salary or after, earnings before interest or after interest. As a result, the market multiples method generates a broad range of valuations depending on how the multiple is calculated and which business parameter the method uses.

Earnings based valuations generate a value of the business by using the appropriate cost of capital to calculate the present value of future earnings or cash flow. However, earnings can be defined as, for example, earnings before taxes (EBT), earnings before interest and taxes (EBIT), earnings before interest, taxes, depreciation and amortization (EBITDA), pre-tax earnings or net income. Similarly, cash flow can be defined as, for example, net income plus depreciation minus capital expenditure. Additionally, the cost of capital is calculated with multiple assumptions. For example, the cost of capital can be defined using equity risk premium, size premium, liquidity premium, industry risk adjustment or company specific risk adjustment. Further complicating the calculation are the numerous methods utilized to generate the valuation, i.e. capitalization of earnings, excess earnings, discounted future earnings/cash flow. Earnings based methods do not address the debt repayment schedule of the acquisition debt. All of these assumptions, variables and methods generate a broad range of valuations.

Currently, there are a number of commercially available valuation software programs. Most valuation products provide multiple business values for a single business because the products utilize many different valuation methods. Many of these software programs require many input variables and input screens, and are subjective with respect to the inputted values. This makes it virtually impossible to understand the impact of the various input on the value of the business.

SUMMARY OF THE INVENTION

The present method and system of valuing an entity with a processor comprises the steps of (1) receiving an input data set comprising an element from a user at an input device associated with the processor, (2) generating a value set comprising an element, (3) calculating an output data set from a the value set and input data set, and (4) iteratively adjusting the element of the value set until the output data set satisfies a condition. The condition comprises comparing an element of the output data set to an element of a valuation condition set to determine if the valuation condition set element is satisfied. If the valuation condition set element is not satisfied, then the system and method adjusts an element in the value set and calculates an adjusted output data set. The system and method repeats the calculation, comparison and adjustment steps until the output data set satisfies the condition.

The present method and system for valuing an entity also comprises the steps, performed by a processor, (1) receiving an input data set comprising an element and a value set comprising an element from a user, (2) calculating an output data set from the input data set and value set, and (3) comparing an element of the output data set with an element of a valuation condition set. The system and method marks an element of the input data set or the output data set when a condition is met.

The present method and system also comprises a calculating module configured to generate an output data set from an input data set and a value set, a compare module configured to compare an element in the output data set to an element in a valuation condition set, a best value module configured to iteratively adjust an element of the value set and calculate the output data set until a condition is met, and an interactive module configured to: calculate an output data set from user defined input, compare the output data set to a valuation condition set, enable the user to adjust the user defined input, calculate an adjusted output data set from the adjusted user defined input, and compare the adjusted output data set to the valuation condition set. A first switch module configured to receive a user initiated command to enable the system to switch from the best value mode to the interactive mode and a second switch module configured to receive a user initiated command to enable the processor to switch from the interactive to the optimization mode.

BRIEF DESCRIPTION OF DRAWINGS

Figure 6A:
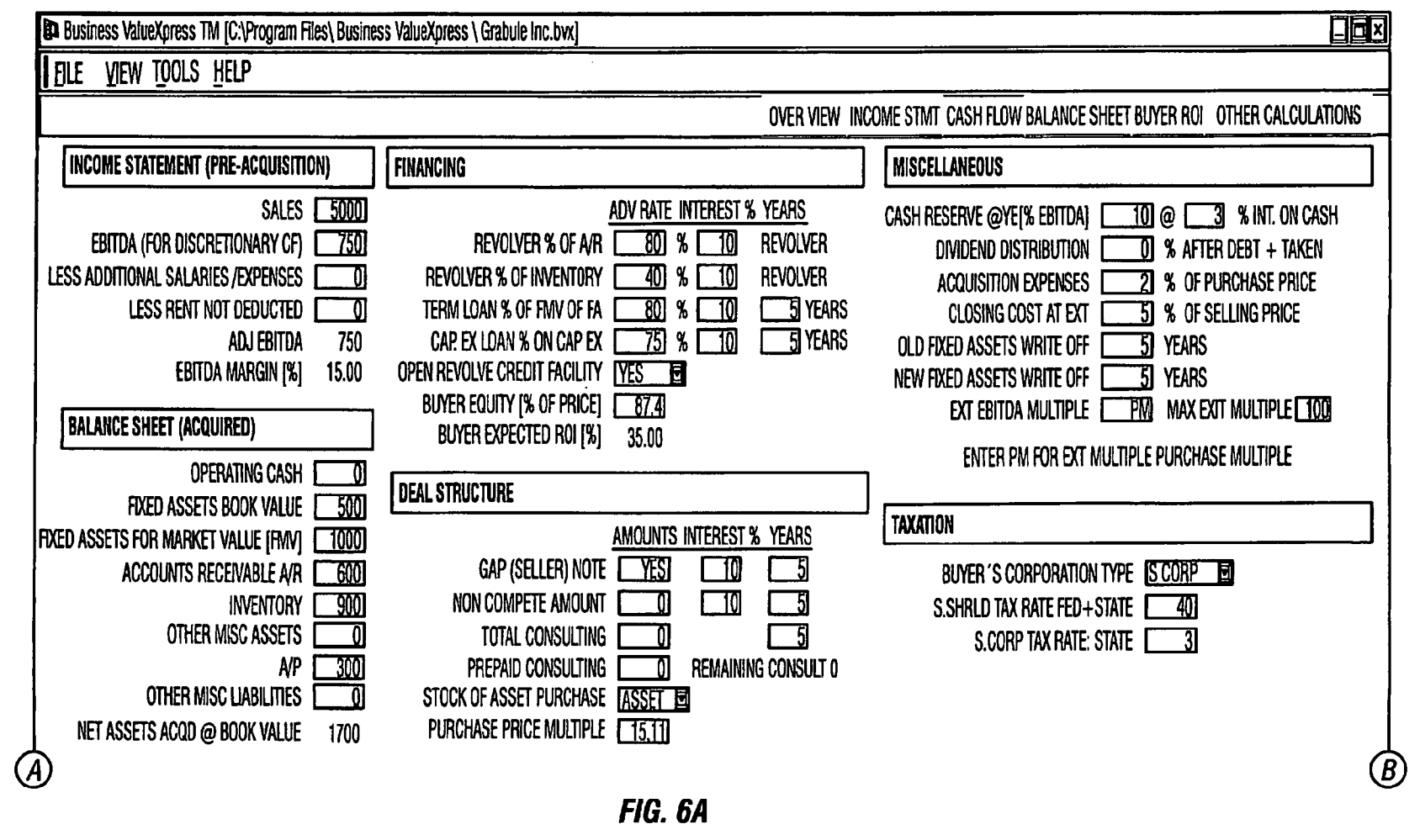

FIGS. 4-12 are display screens of the present method and system.

DETAILED DESCRIPTION OF DRAWINGS

Figure 1:
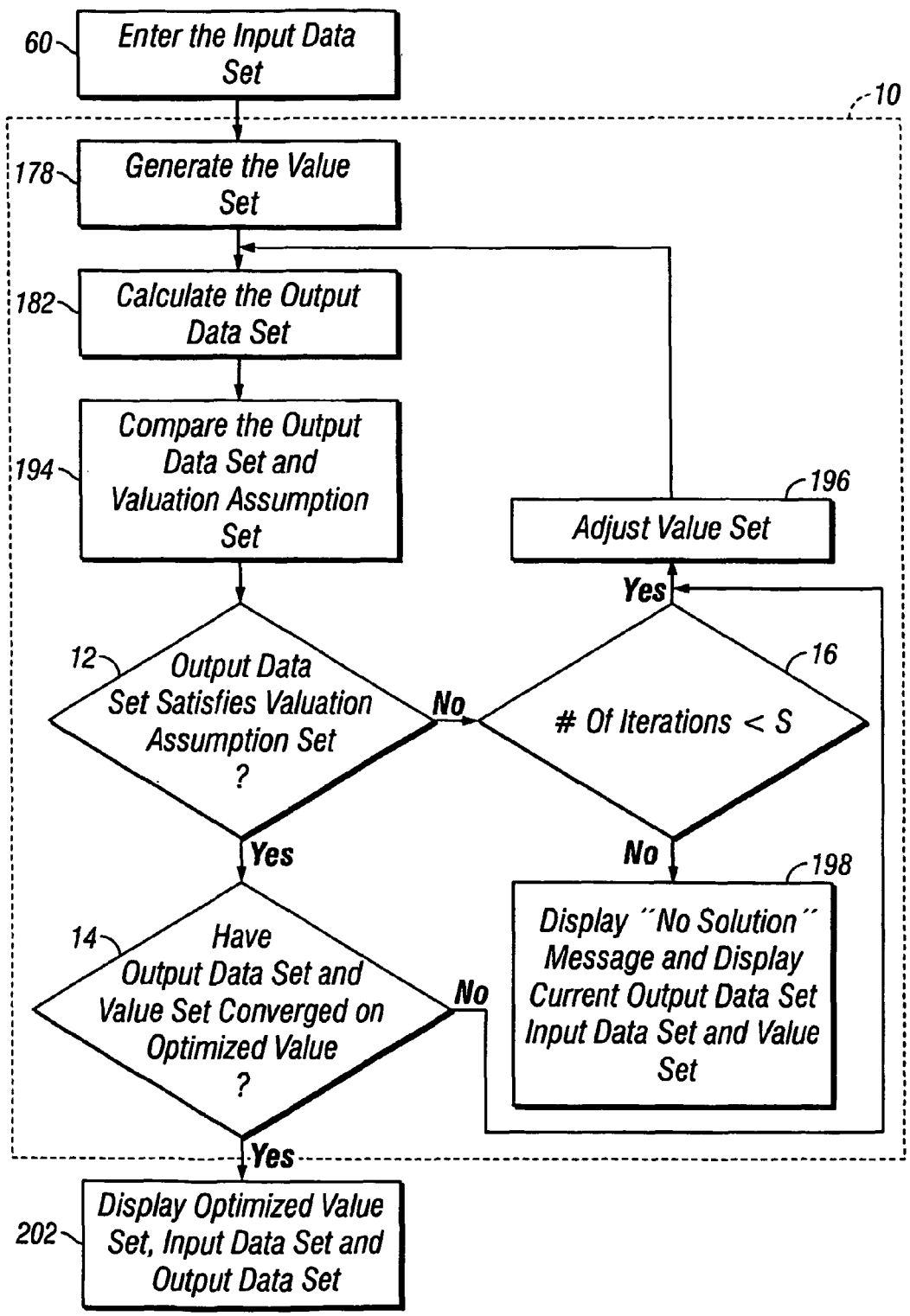
FIG. 1 is a flow chart of a method of operation of the present method and system.

The present system and method offers an automated and interactive tool combined into a single system and method for valuing an entity, such as a business. The system and method operates off a principle valuation objective that can be summarized as follows:

The Seller wants the best price for the business and the Buyer is willing to pay the price that meets financial return objectives and financial commitments.

This principle objective manifests itself into a series of valuation conditions, the first valuation condition set, comprising the following:

1. Seller wants the maximum price;
2. Buyer wants to achieve a certain minimum Return on Investment ("ROI");
3. Buyer wants to meet all financial obligations to creditors;
4. Buyer wants to pay proper taxes;
5. Buyer wants to maintain a safety cash reserve at year end;
6. Buyer wants to meet all the cash needs of the operations;
7. Buyer does not want negative cash flow;
8. Buyer does not want to plan for equity infusion after the acquisition;
9. There is ample acquisition capital available in the market place and that a Buyer can be found with the necessary equity to complete the acquisition;
10. Buyer wants to maximize bank borrowing;
11. Buyer wants to minimize additional funding ("Gap Funding") or restrict Gap Funding to not exceed a specific amount;
12. Buyer wants to first borrow against the Accounts Receivable ("A/R"), then against the Inventory, then against the Fixed Assets;
13. Buyer is willing to accept negative taxable income as long as the cash flow is not negative (in another preferred embodiment, the user controls taxable income);
14. Buyer wants to use excess cash flow to pay down debt; and
15. Lenders will not refinance the term loans during the planning horizon.

The system and method converts the valuation condition set into a series of equations and constraints. The system operates in two distinct, but related, modes offering a user versatility in conducting business valuations. In one mode of the system, the Best Value Mode (FIG. 1), the system automatically, through an iterative process 10, generates an optimized value set, and calculates an output data set from input data set comprising user inputted values and the optimized value set. The system determines that the value set is optimized when the elements of the output data set satisfy the elements of the valuation condition set 12, and have converged on optimized values 14. In this mode, the system also determines if no value set exists that enables the calculation of an output data set that satisfies the valuation condition set.

In another mode, the Interactive Mode (FIG. 2), the system calculates an output data 20 set from user defined input 22 comprising the input data set 24 and the value set 26, compares the elements of the output data set to the elements of the valuation condition set 28, and flags elements of the input data set and output data set that do no satisfy the valuation condition set 30. The user may modify the user defined input 32 to create "what if" output data sets. The present system provides the user the ability to switch between the Interactive Mode and Best Value Mode.

Figure 3:
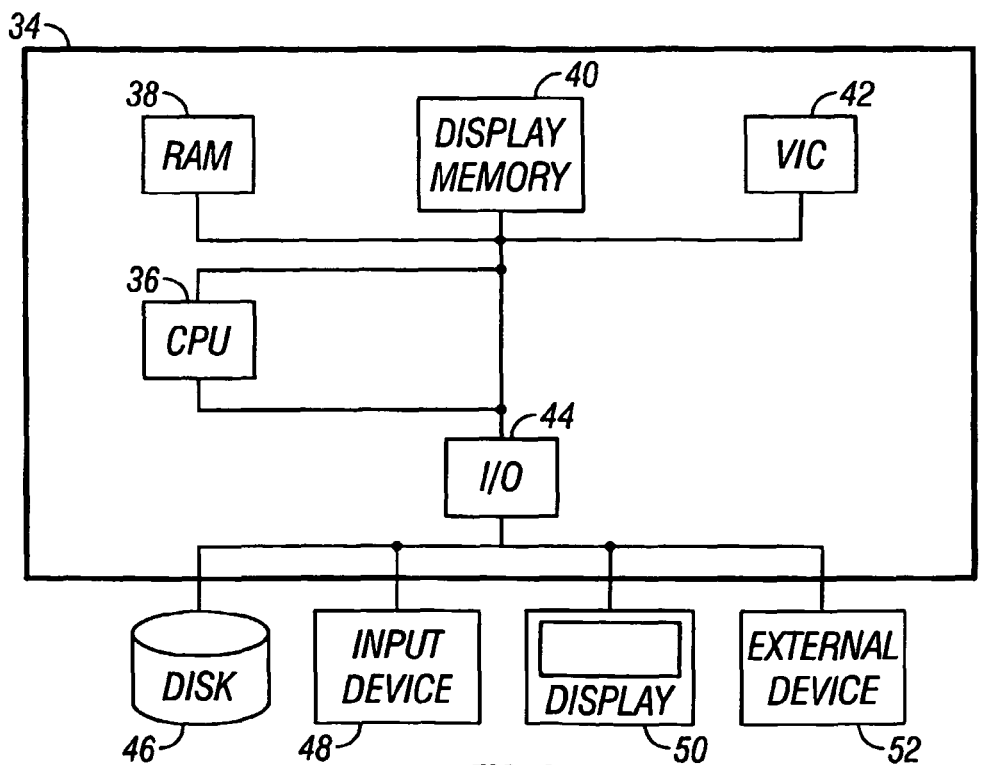
FIG. 3 schematically shows the computer hardware and software components of the method and system of FIGS. 1-2.

The system and method utilizes a processor to perform these functions. FIG. 3 illustrates the processor 34 used by the method and system. The processor preferably includes conventional hardware such as central processing unit (CPU) 36, random access memory (RAM) 38, display memory 40, video interface circuit (VIC) 42, input/output controller (I/O) 44, computer readable storage medium 46, i.e. hard disk, input device 48, display 50, and external device 52. The processor basically functions as a conventional personal computer.

As shown in FIG. 3, the CPU is directly coupled to each of the other elements of the processor. The CPU executes program code (not shown) stored in one or more RAM or the hard disk to carry out the functions and acts described in connection with the processor. Specifically, the processor is capable of (1) executing mathematical operations source code programmed into the processor with a the aid of programming language and environment software, such as MicroSoft Corp.'s VISUAL BASIC®, or (2) running spreadsheet software stored on the disk, such as MicroSoft Corp.'s EXCEL®. The CPU preferably comprises at least one high-speed digital data processor adequate to execute program modules consistent with the method and system, such as generation and accumulation of input data, calculation of output data, and comparison of output data and conditions. The CPU interacts with RAM and the hard disk to execute stored program code according to conventional data processing techniques.

As also shown in FIG. 3, the input device 48 permits the processor to receive input data, and, although shown as a single device, may comprise one or more data input devices of various types, such as an alphanumeric keyboard, a numeric keypad, a bar code scanner, a credit card reader, a disk drive, a memory, an electronic communication line, and a wireless transceiver. The input device 48 preferably transmits received information to the CPU 36 for storage in the disk 48 or in the RAM 38. The VIC 42 comprises a video driver sending signals to the display 50 for displaying either text or graphics based on the contents of display memory 40. The display 50 is preferably large enough to display the valuation template of the present system. The external device 52 allows operability of other components with the processor, such as, for example, a modem, a printer, a scanner, a photocopying device, or any other form of input or output device. As shown in FIG. 3, the hard disk 43 preferably comprises a large capacity memory capable of storing the program code and desired output and accompanying reports.

Figure 4A:
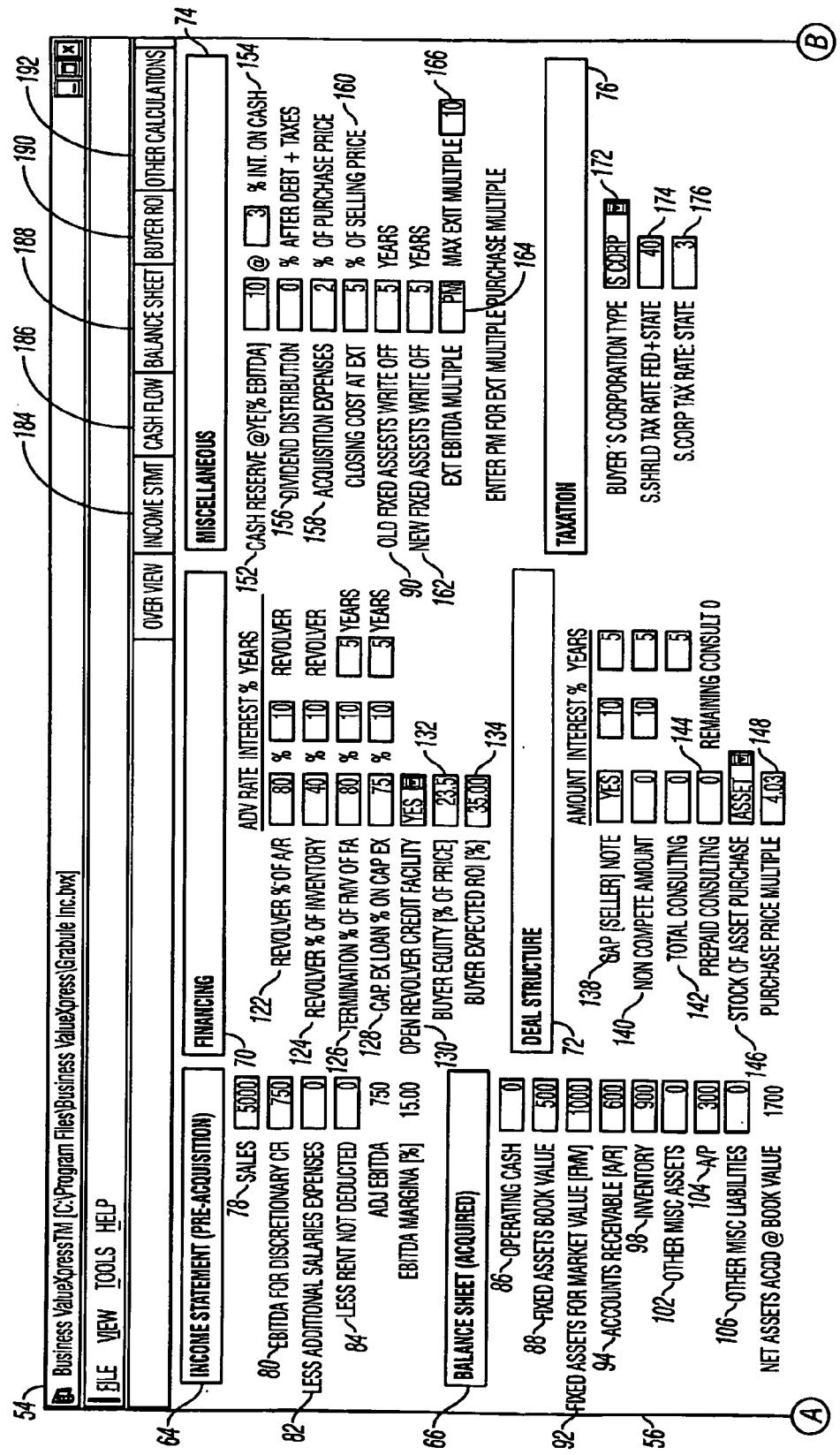

Both the Best Value and Interactive Modes utilize the same valuation template 54, shown in FIG. 4, as the starting point for operation. The valuation template 54 serves both as a platform for the user to input data into the system, as well as an organized means for displaying the input data and an output data set summary. Use of a single input and output template simplifies the complexity of prior art systems that include multiple input and output screens. In the present system, cells for entering and displaying values comprising an input data set and a value set are in the top ⅔ 56 of the valuation template 54. A summary of the output data set generated by system is displayed in the bottom ⅓ 58 of the valuation template 54.

Returning to FIGS. 1 and 3-4, in the Best Value mode, the system determines the optimized value set through an iterative process 10. The optimized value set, comprises the optimized Best Business Value, the Required Buyer Equity, and Mezzanine Equity.

In operation, the processor first displays the valuation template 54 on the display 50 and the user inputs values for the elements of the input data set 60 into the proper cells in the valuation template. The processor displays the values in the valuation template as the user enters individual values. The user jumps from cell to cell with the "tab" key on the keyboard or by using the mouse or other peripheral device. The system will not function unless the user inputs values in all cells comprising the elements of the input data set and will return a "Check Input Values" error message in the display 62 section of the valuation template 54 if any cell is left blank.

Turning to FIG. 4, the elements of the input data set comprise: income statement data 64, balance sheet data 66, future growth and expenses data 68, financing data 70, deal structure data 72, miscellaneous data 74, and taxation data 76. In one embodiment of the present invention, income statement input data breaks down into: pre-acquisition sales 78; earnings before interest, taxes, depreciation and amortization ("EBITDA") 80; reduction from EBITDA for salaries, additional expenses 82, and rent 84.

The EBITDA reduction for salaries and additional expenses input data cell 82 is designed to make adjustments to the EBITDA entered in the EBITDA input cell 80. The system deducts the value of this cell from the EBITDA input cell. A value of zero may be entered if the EBITDA is correct. A positive or negative number may be entered in this cell. A positive value will reduce the value of EBITDA. A negative value will increase EBITDA. The EBITDA reduction for rent input data cell 84 is also designed to make adjustments to the EBITDA. If the rent has previously been deducted as part of the EBITDA input data cell, a value of zero may be entered. The rent value entered will also be used as an income input in calculating the real estate financials.

The second category in the input data set pertains to the balance sheet of the business before acquisition. Balance sheet entries are critical to the valuation of the business because these entries have a significant impact on the cash flow of the business. The system values the business based only on the operating assets and the operating liabilities entered by the user in this section. The first balance sheet input cell is Operating Cash 86. Operating Cash is the amount of cash not available for debt service, has no borrowing capacity and is required to keep the business running. The Future Operating Cash requirement is increased in proportion to the increase in future Sales; thus reducing cash available for debt service and other operating needs.

The Fixed Assets—Book Value input data cell 88 is used by the system to determine Stock Purchase Value. The Book Value of the fixed assets on the Seller's books that the Buyer will be acquiring should be entered into this cell. The user enters zero if there are no fixed assets. The system adjusts the Book Value at the rate specified in Miscellaneous Inputs: Old Fixed Assets Write-off 90.

The system uses data from the Fixed Assets—Fair Market Value input data cell 92 to determine the Asset Purchase Value and to calculate the amount of Term Loan borrowing in both a Stock Purchase and an Asset Purchase. The user enters the Fair Market Value ("FMV") of the fixed assets that the buyer will be acquiring. The system allocates FMV to the fixed assets of the entity and adjusts them at the rate specified by the user in the Miscellaneous Inputs: Old Fixed Assets Write-off 90.

Next, the user enters the Net Accounts Receivable ("A/R") in the Accounts Receivable input data cell 94. The system assumes that the A/R amount is the amount required to maintain the sales level entered into the Sales input data cell 78. Future A/R is changed in proportion to Sales. The Advanced Features 96 (FIG. 5) of the system also enable the user to manually input A/R for each year.

Figure 5B:
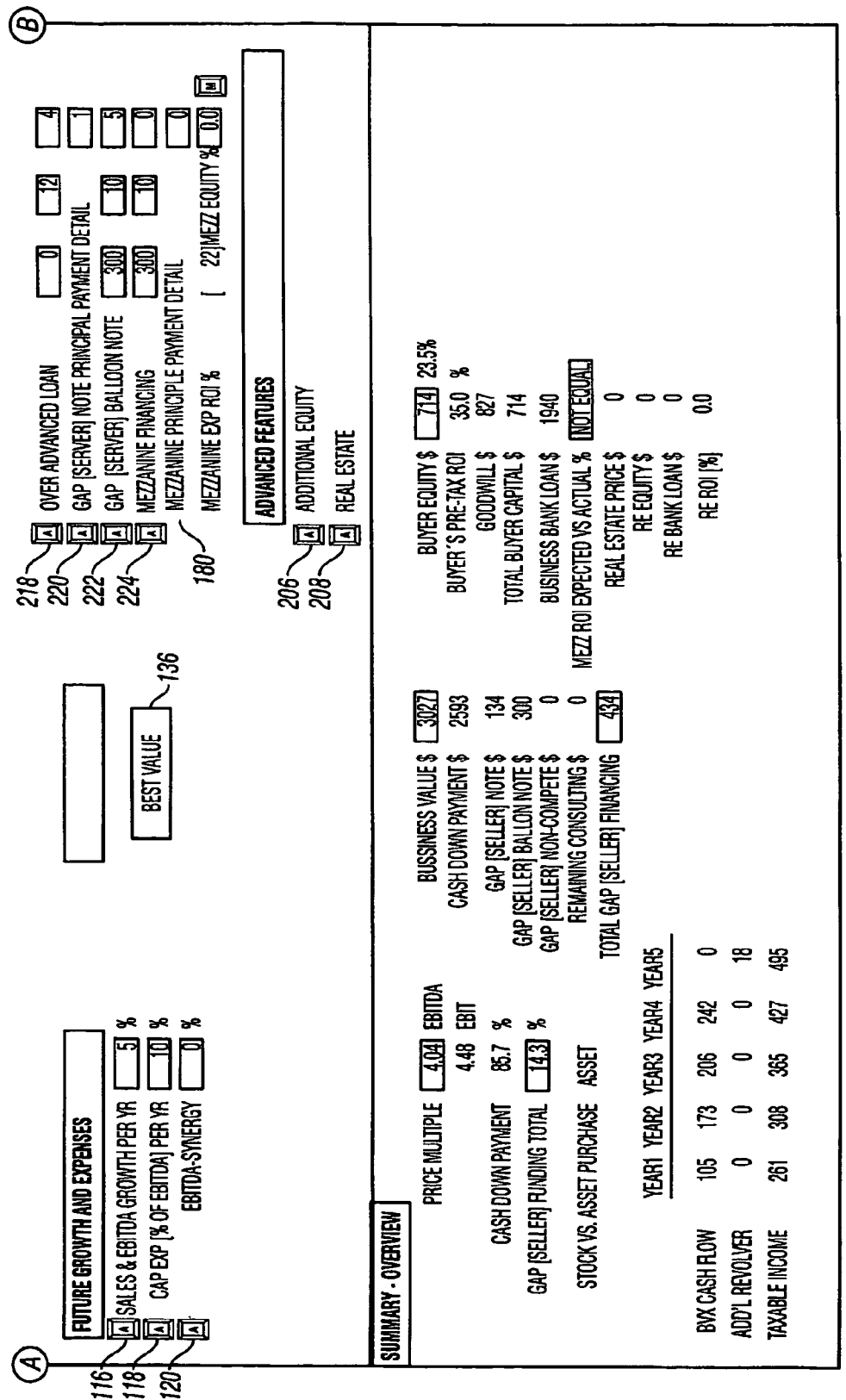
Figure 8A:
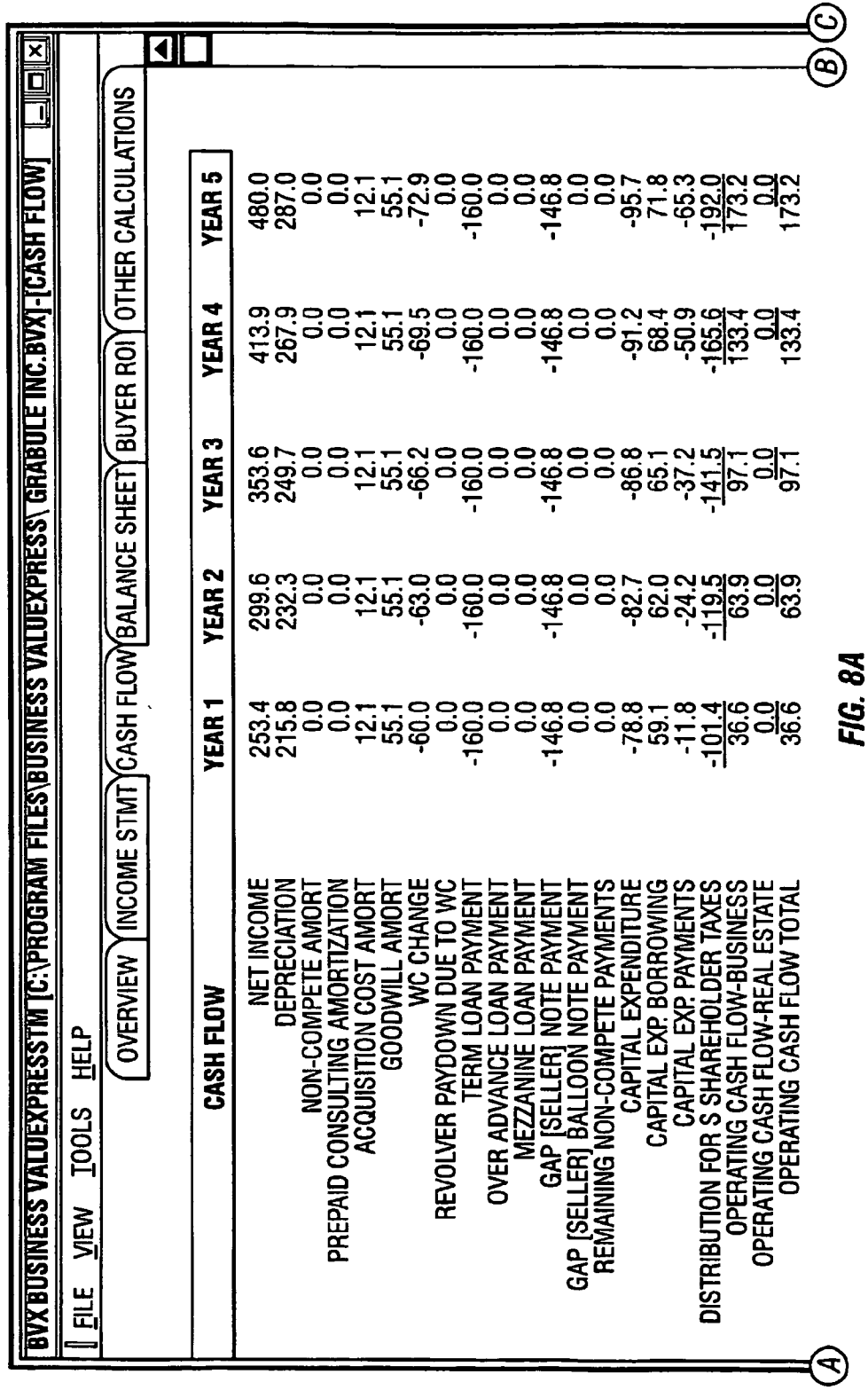
Figure 10A:
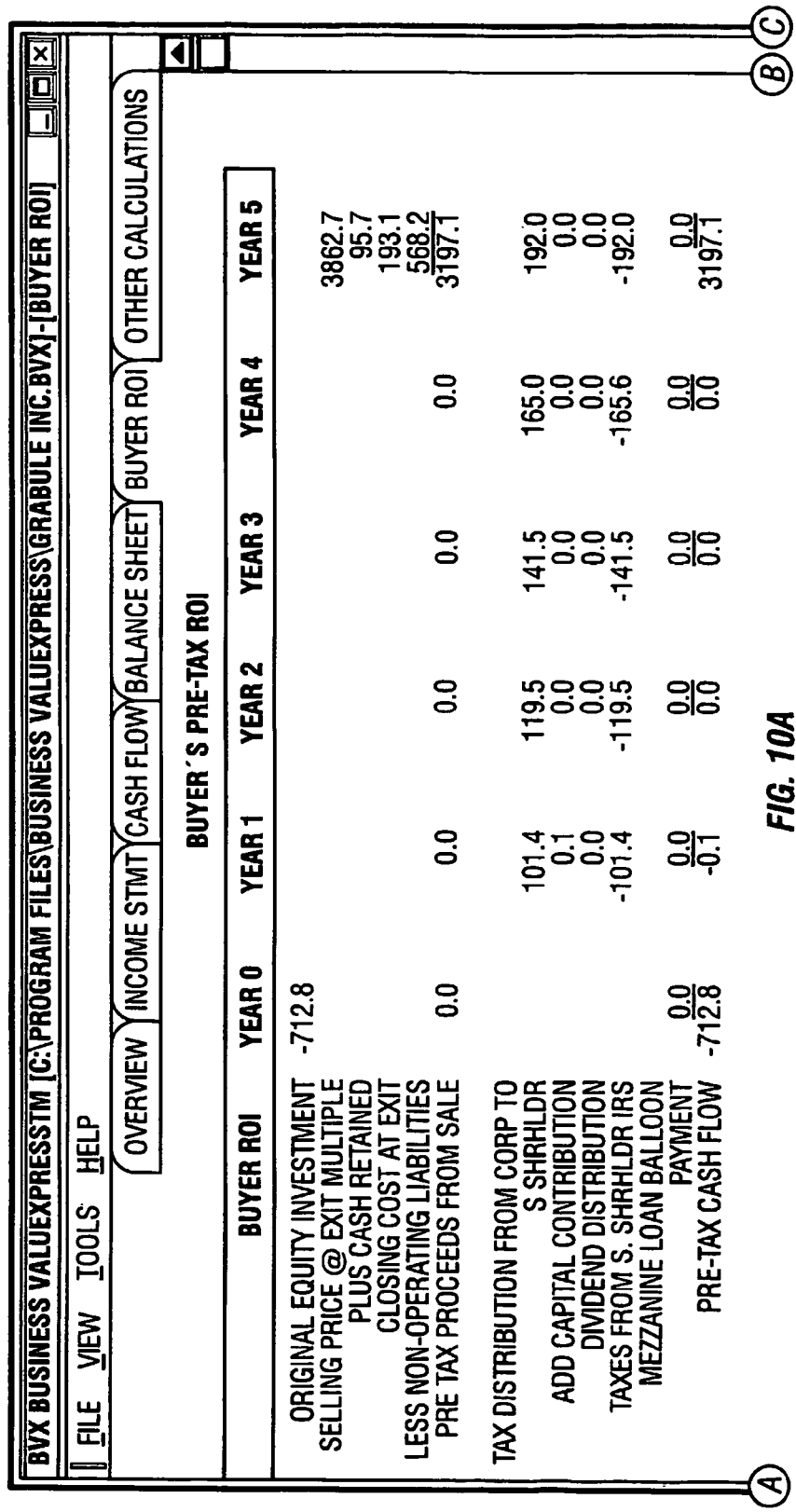
Figure 10B:
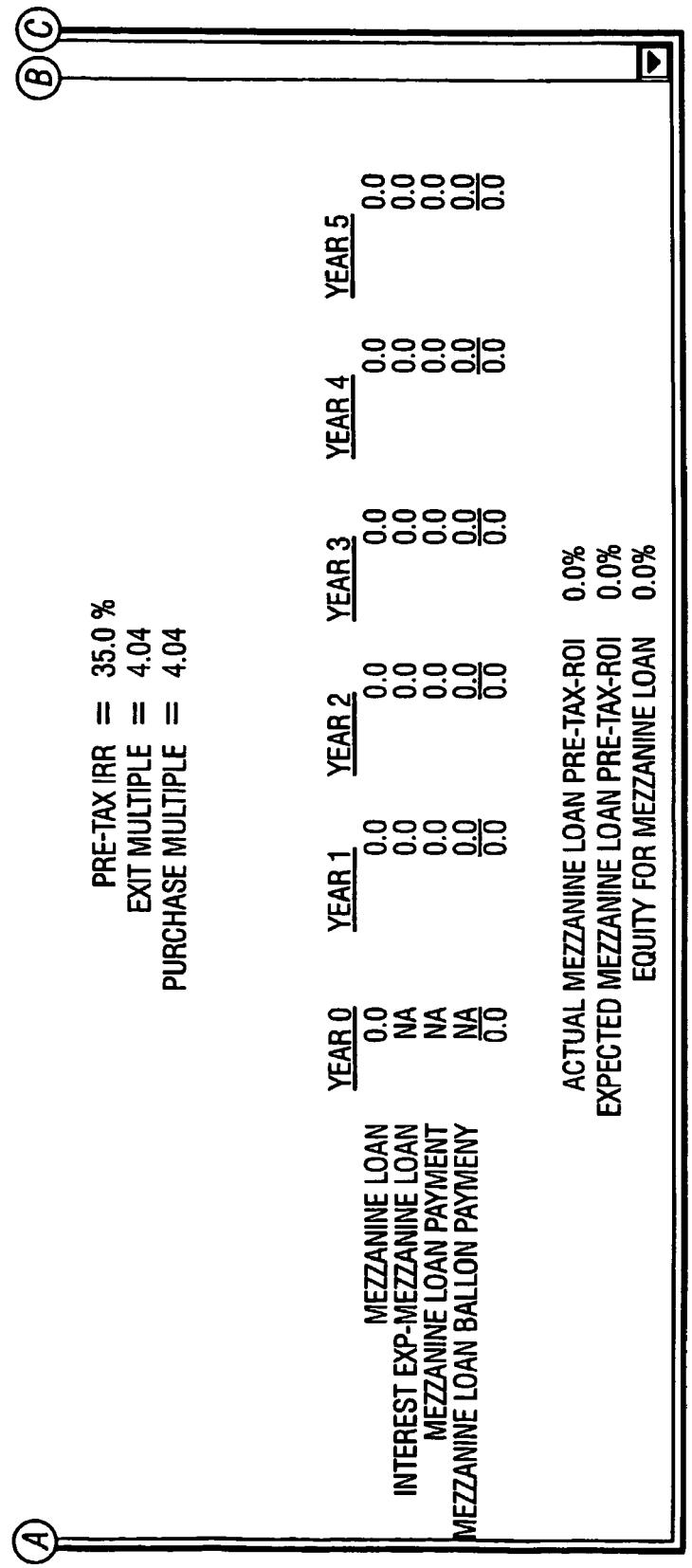

The user also enters the total inventory of the business in the Inventory input data cell 98. The system assumes that the value entered is the value required to maintain the sales level entered in the Sales input data cell. Future Inventory is changed in proportion to the Sales. The Advanced Features enable manual input of Inventory by the user for each year 100 (FIG. 5).

The remaining elements of the income statement data section include Miscellaneous Assets 102, Accounts Payable and Accrued Expenses 104, and Miscellaneous Liabilities 106. In the Miscellaneous Assets cell 102, the user enters operating assets that do not change in the future with the sales level, for example, pre-paid rent deposit. The user also enter Accounts Payable ("A/P") and Accrued Expenses ("A/E") 104 required to maintain the sales level entered in Sales. Future A/P & A/E are changed in proportion to the Sales. The Advanced Features enable manual input of A/R and A/E by the user for each year 108 (FIG. 5).

The third section of the input data set comprises future growth and expense inputs 68. The user enters values for the following variables in this section Sales and EBITDA Growth per year 110; Capital Expenditures (percent of EBITDA) per year 112; and EBITDA Synergy 114.

In the Sales & EBITDA Growth per year cell 110, the user enters the percent growth in Sales & EBITDA per year. The system will grow both the Sales & EBITDA amount entered in the Income Statement section by the percentage entered in this cell for each one of the next 5 years. The Advanced Features enable manual input of Sales by the user for each year 116 (FIG. 5).

In the Capital Expenditure per year cell 112, the user enters future Capital Expenditure as a percent of EBITDA. The system calculates Capital Expenditure for each one of the next 5 years by multiplying the respective EBITDA by the percentage entered in this cell. The Advanced Features enable manual input of Capital Expenditures by the user for each year 118 (FIG. 5).

In the EBITDA Synergy cell 114, the user enters the anticipated Synergy between the Buyer and the business or the anticipated operating costs changes after the acquisition or merger. The user enters synergy or the cost changes as an increase or decrease in the EBITDA percentage margin. For example, if EBITDA margin entered in the Income Statement is 15 percent and is anticipated to improve to 18 percent, then enter the increase of 3 percent in this cell. The Advanced Features enable manual input of the EBITDA margin by the user for each year 120 (FIG. 5).

The fourth section of the input data set comprises Financing Inputs 70. In this section, the user enters values for Revolver—percent of A/R 112; Revolver—percent of Inventory 124; Term Loan percent of FMV of Fixed Assets 126;

Capital Expenditure Loan 128; Open Revolver Credit Facility 120; Buyer Equity 132, and Buyer's Expected Return on Investment ("ROI") 134.

In the Revolver—percent of A/R cells 122, the user enters the loan advance rate as a percent of the accounts receivable amount entered in the Accounts Receivable (A/R) cell and enters the interest cost of the A/R loan. The system assumes that A/R borrowing is a revolver with no principal repayments.

In the Revolver—percent of Inventory cells 124, the user enters the loan advance rate as a percent of the inventory amount entered in the Inventory cell and enters the interest cost of the Inventory loan. The system assumes that Inventory borrowing is a revolver with no principal repayments.

In the Term Loan percent of FMV of Fixed Assets cells 126, the user enters the loan Advance Rate as a percentage of the fair market value of the fixed assets amount entered in the Fixed Assets—Fair Market Value (FMV) cell, enters the Interest Cost of the Term Loan, and enters the terms (repayment period) of the Term Loan in number of years. The system amortizes the Term Loan in uniform annual principal payments over the term of the loan beginning with the first year post-acquisition.

In the Capital Expenditure Loan cells 128, the user enters the loan Advance Rate as a percentage of the capital expenditure. Capital expenditure is calculated for each year based on the input in the Capital Expenditure cell 112 or per input in Advanced Features cells 118 (FIG. 5). The user also enters the Interest rate of the Capital Expenditure Loan and the Terms (repayment period) in number of years for the Capital Expenditure Loan. The system amortizes the Capital Expenditure Loan in uniform annual principal payments over the term of the loan beginning in the year of the capital asset acquisition.

In the Open Revolver Credit Facility cells 130, the user selects "Yes" if the lender will provide an on going revolver credit facility tied to the changing A/R and Inventory and selects "No" if the pre-acquisition revolver amount will not change.

The Buyer Equity cell 132 acts both as an input cell for the user and an output cell for the system. No entry is required in this cell to generate a solution set while the system operates in the Best Value Mode (FIG. 1). When the user clicks on the "Best Value" icon 136, the system overrides any data the user may have entered into this cell or data displayed in this cell from a previous valuation, and generates and displays an optimized value representing required Buyer Equity in this cell. The Buyer Equity is calculated as a percentage of the Purchase Price. When the system operates in the Interactive Mode (FIG. 2), the user inputs Buyer Equity in this cell 132.

In the Buyer's Expected ROI cells 134, the user enters the Buyer's expectation of the pre-tax ROI. The value entered into this cell also is a condition in the first valuation condition set.

The fifth section of the input data set comprises Deal Structure input 72. The user enters values for Gap (Seller) Note 138; Gap (Seller): Non-Compete Agreements 140; Total Consulting 142; Prepaid Consulting 144; Stock Purchase or Asset Purchase 146; and Purchase Price Multiple (PM) 148.

The value entered into the Gap (Seller) Note cell 138 becomes part of the valuation condition set. In the Gap (Seller) Note cells, the user either selects "Yes" to prompt the system to assume unlimited Gap (Seller) Note funding availability, or caps the value of the Gap (Seller) Note by entering "0" if the user wants an "all cash" transaction, meaning no Gap (Seller) Note, or enters a specific dollar amount for the Gap (Seller) Note.

The system calculates a value for the Gap (Seller) Note by subtracting the Buyer Equity and Bank Loan value from the Business Value. If the system calculates a value for Gap (Seller) Note that exceeds the cap value entered by the user, then this condition is not met. Accordingly, the system may not be able to generate an optimized value set when Gap (Seller) Note data is a condition in the first valuation condition set, causing the system to display a "No Solution" message. Alternatively, when the user enters "Yes" in this cell, there is no cap on the Gap (Seller) Note and the condition is always met. The system calculates the value of the Gap (Seller) Note and displays this value in the output data set summary.

The user also enters the Interest Rate of the Gap (Seller) Note and the repayment period in number of Years for the Gap (Seller) Note. The system amortizes the Gap (Seller) Note in uniform annual principal payments over the term of the Note beginning with the first year post-acquisition.

In the Non-Compete Agreement cells 140, the user enters the dollar amount of any non-compete payments, enters the Interest Rate of the non-compete payments, and enters either "Cash" if the non-compete is pre-paid as part of the up-front cash payment, or the number of years to pay off the non-compete amount, or "0" if the non-compete is a balloon payment at the end of 5 years. The system pays down the non-compete amount in uniform equal annual payments over the duration of the non-compete beginning with the first year post-acquisition. For tax purposes, the system amortizes non-compete over a 15-year period.

In the Total Consulting cells 142, the user enters the dollar amount of Total Consulting payments, and enters the number of years over which the Remaining Consulting payments will be made. The system automatically calculates the Remaining Consulting amount as the difference between the Total Consulting amount and the Prepaid Consulting amount entered in Prepaid Consulting cell 144. The system pays down the Remaining Consulting amount in uniform equal annual payments over the duration of the Consulting beginning with the first year post-acquisition. The system amortizes the Prepaid Consulting amount over the same time period as the Remaining Consulting amount.

In the Stock Purchase or Asset Purchase cell 146, the user selects "Stock" for a Stock Purchase or selects "Asset" for an Asset Purchase. If "Stock" is selected, the system uses the Book Value of the Fixed Assets 88, amortizes the goodwill over 40 years and does not deduct the goodwill amortization to calculate the taxable income. Alternatively, if "Asset" is selected, the system uses the Fair Market Value of the Fixed Assets 92, amortizes the goodwill over a 15-year period, and deducts the goodwill amortization to calculate the taxable income.

The Purchase Price Multiple ("PM") cell also acts as an input cell 148 for the user and an output cell for the system 150. No entry is required in this cell to generate a value set while the system operates in the Best Value Mode. When the user clicks on the "Best Value" icon 136, the system overrides any data the user may have entered into this cell or data displayed in this cell from a previous valuation, and generates and displays an optimized value representing the Purchase Price Multiple in the output data set summary 150. When the system operates in the Interactive Mode (FIG. 2), the user inputs the Purchase Price Multiple in this cell 148.

The sixth section of the input data set comprises Miscellaneous Inputs 74. In this section, the user enters values for Cash Reserve at Year End 152; Interest Rate on Cash 154; Dividend Distribution 156; Acquisition Expense 158; Closing Costs at Exit 160; Old Fixed Assets Write-off 90; New Fixed Assets Write-off 162; Exit Multiple 164; and Maximum Exit Multiple 166.

In the Cash Reserve at Year End cell 152, the user enters the Cash Reserve amount as a percent of EBITDA and enters the Interest Rate 154 that can be earned on the cash balance on the Balance Sheet. The system has a built-in minimum Cash Reserve requirement of 1% of sales and maintains cash reserve either as a percent of EBITDA or 1% of sales, whichever is larger. Cash reserve is the minimum amount of cash balance that the user wants the system to maintain at the end of each year while calculating a business valuation. When the system determines the optimized value set, one of the conditions in the condition set is that the Buyer does not have a negative System Cash Flow ("SCF"), where the System Cash Flow is defined as the cash flow after all obligations have been serviced. The system calculates this value SCF after making allowance for the Cash Reserve specified in this cell.

In the Dividend Distribution cell 156, the user enters the percent of the System Cash Flow that can be distributed to the shareholder. In the Acquisition Expense cell 158, the user enters the Acquisition Expense as a percent of the Purchase Price. The system automatically capitalizes Acquisition Expense on the Balance Sheet and amortizes it over 5 years.

In the Closing Costs at Exit cell 160, the user enters Closing Costs as a percent of the Selling Price 168. Closing cost is deducted from the Selling Price 168 while calculating Buyer's ROI 170. In the Old Fixed Assets Write-off cell 90, the user enters the remaining depreciation life, in number of years, over which to write-off the old fixed assets on a straight-line basis. In the New Fixed Assets Write-off cell 162, the user enters the depreciation life, in number of years, for the new fixed assets acquired with the capital expenditures.

In the Exit Multiple ("EM") cell 164, the user enters the Purchase Price Multiple ("PM") if the EM equals the PM. Alternatively, the user can enter a specific EM. In the Max Exit Multiple cell 166, the user enters a value for the maximum Exit Multiple (MaxEM). This input is used only when PM is entered in the EM cell. The system generates an optimized value set whenever EM=PM, but it caps the EM to MaxEM whenever the PM exceeds MaxEM. Capping of the EM helps prevent system from calculating run away valuations resulting from an EM=PM assumption in high growth or high synergy situations.

The seventh category in the input data set comprises Taxation Inputs 76. In this section, the user inputs data relating to Corporation Type and Tax Rates. In the Corporation Type cell 172, the user selects the Buyer's corporate structure, either an S Corporation or a C Corporation. If the user selects the S Corporation option, the user enters shareholder's, or shareholders, combined federal and state income tax rate 174, and the S Corporation's state income tax rate 176. If the user selects the C Corporation option, the user enters the corporate federal and state income tax rate.

Once the user completes inputting the first input data set 60, clicking on the "Best Value" icon 136 prompts the system to, through an iterative process 10, automatically generate and display an optimized value set or determine that no optimized value set exists. In the first step of this process, the processor generates values for the elements of the value set 178. In this embodiment, the processor randomly generates the value for the Best Business Value with a random number generator algorithm. Required Buyer Equity 132 and Mezzanine Equity 180 (FIG. 5) have fixed initial values that are stored in the memory 46 (FIG. 3) and are retrieved by the processor 36 (FIG. 3) during this step. In other embodiments, all elements of the value set have fixed initial values stored in the memory 46 (FIG. 3), or all values for the elements of the value set are generated randomly with the random number generator. In yet another embodiment, values for the elements of the value set may be imported from an external source 52 (FIG. 3).

Using the input data set and value set, the system calculates an output data set 182. The output data set comprises Income Statement data for the acquired business 184, Cash Flow data for the acquired business 186, Balance Sheet data for the acquired business 188, Buyer's Return on Investment 190, and additional calculations 192 such as bank loans, source of funds data, use of funds data, purchase price allocation, financial rations, depreciation schedule, and real estate financials. The system calculates the output data set with conventional methods used in the finance and accounting fields to calculate financial statements and return on investment, along with built-in algorithms defining borrowing sequence and funds disbursement sequence.

Next, the processor compares the values in the output data set to the valuation condition set 194. All the conditions in the valuation condition set are built-in to the system. The following built-in conditions can be overridden by the user entering numeric values in the Advanced Features section: Buyer does not want negative cash flow, and Buyer does not want to plan for equity infusion after the acquisition. Additionally, the following conditions are dependent on values the user enters as part of the first input data set: Buyer wants to achieve a certain minimum Return on Investment ("ROI"), and Buyer wants to minimize additional funding ("Gap Funding") or restrict Gap Funding to not exceed a specific amount.

If any of the conditions in the valuation condition set are not satisfied 12, the system adjusts the values in the value set 196, calculates an adjusted output data set with the input data set and the adjusted value set 182, and compares the adjusted output data set to the valuation condition set 194.

The processor iteratively repeats these steps until it generates an output data set that meets the conditions of the valuation condition set within certain tolerance limits, i.e. changes to the maximum purchase price in subsequent iterations are not greater than the tolerance limits. In this manner, the system converges on optimized values for the elements of the value set as it iteratively repeats the calculation, comparison and adjustment steps 14.

If the system determines after a specified number of iterations 16 or after a specified time period that repeated adjustment of the values of the elements of the value set is not converging on optimized values, the system determines that no optimized value set exists 198, displays a "No Solution" 200 message on the valuation template display. Current values for the elements of the value set and output data set are displayed on the valuation template with the input data set. In one embodiment, the system determines that no optimized value set exists with five independent value sets before displaying the "No Solution" message.

Adjustment of the values of the value set elements occurs using mathematical optimization techniques. In one embodiment of the present invention, the adjustment step is performed using non-linear programming techniques. This embodiment utilizes a non-linear programming solver module. Solver modules of this type are readily available. The solver module also performs the comparison step by receiving the valuation condition set and treating the value set as decision variables. In another embodiment of the present invention, the adjustment of the value set occurs utilizing a solver module incorporating a genetic or an evolutionary algorithm.

Once the system generates the optimized value set, it displays the optimized values and output data set summary on the valuation template 202. The system enables the user to access detailed schedules (shown in FIGS. 7-11) containing the output data set by clicking on the appropriate icon 154, 186, 188, 190, 192 on the valuation template. In an alternative embodiment, the detailed schedules are accessible through pull-down menus at the top of the valuation template.

Figure 2:
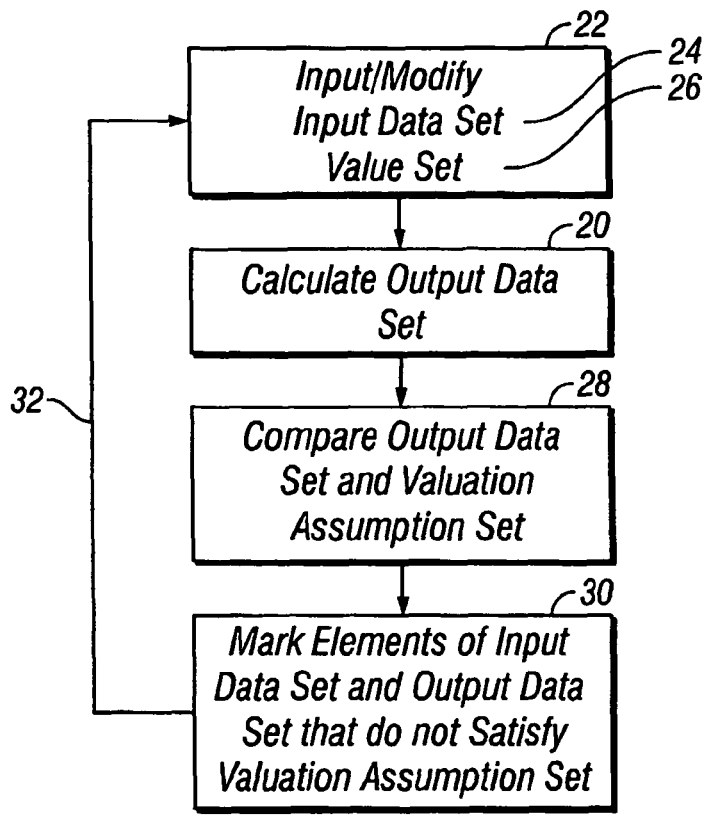
FIG. 2 is a flow chart of a method of a second method of operation of the present method and system.

FIG. 2 shows the Interactive Mode of the system. The system operates from the same valuation template 34 (FIG. 4) used in Best Value Mode and calculates an output data set 20 from user defined inputs 22 comprising the input data set elements 24 and value set elements 26. Once the user enters values in the required cells, pressing the "Enter" key prompts the system to: calculate and display the output data set 20, compare the output data set to the valuation condition set 28, and mark values from the input data set and output data set summary that do not satisfy the valuation condition set 30. Each time the user modifies an element of the input data set or value set 22 and presses the "Enter" key on the keyboard, the processor repeats these steps. If the user does not enter values in all the input data set cells or value set cells and presses the "Enter" key, the system will display the "Check Values" error message in the valuation template display 62 (FIG. 4).

In the Interactive Mode, the comparison step 28 comprises executing a program code module comprising a series of "if-then" instructions, i.e. if the user enters a value of "0" for in the Gap (Seller) Note cell, indicating that the transaction must occur without non-bank funding, and the system calculates a value for the Gap (Seller) Note as $50,000, then this condition is not met and system flags the Gap (Seller) Note cells in the input and output sections of the valuation template.

The user may click on the "Best Value" Icon 136 (FIG. 4) at any time while in the Interactive Mode to prompt the system to switch to the Best Value Mode and generate an optimized value set. Likewise, after the system generates an optimized first value set, the system returns to the Interactive Mode if the user modifies any input cells. Calculation of a new output data set occurs when the user presses the "Enter" key on the keyboard. The present system and method offers the user maximum versatility in determining the factors most critical to the transaction and calculate the best value of the business to be sold as part of the transaction.

Figure 12:
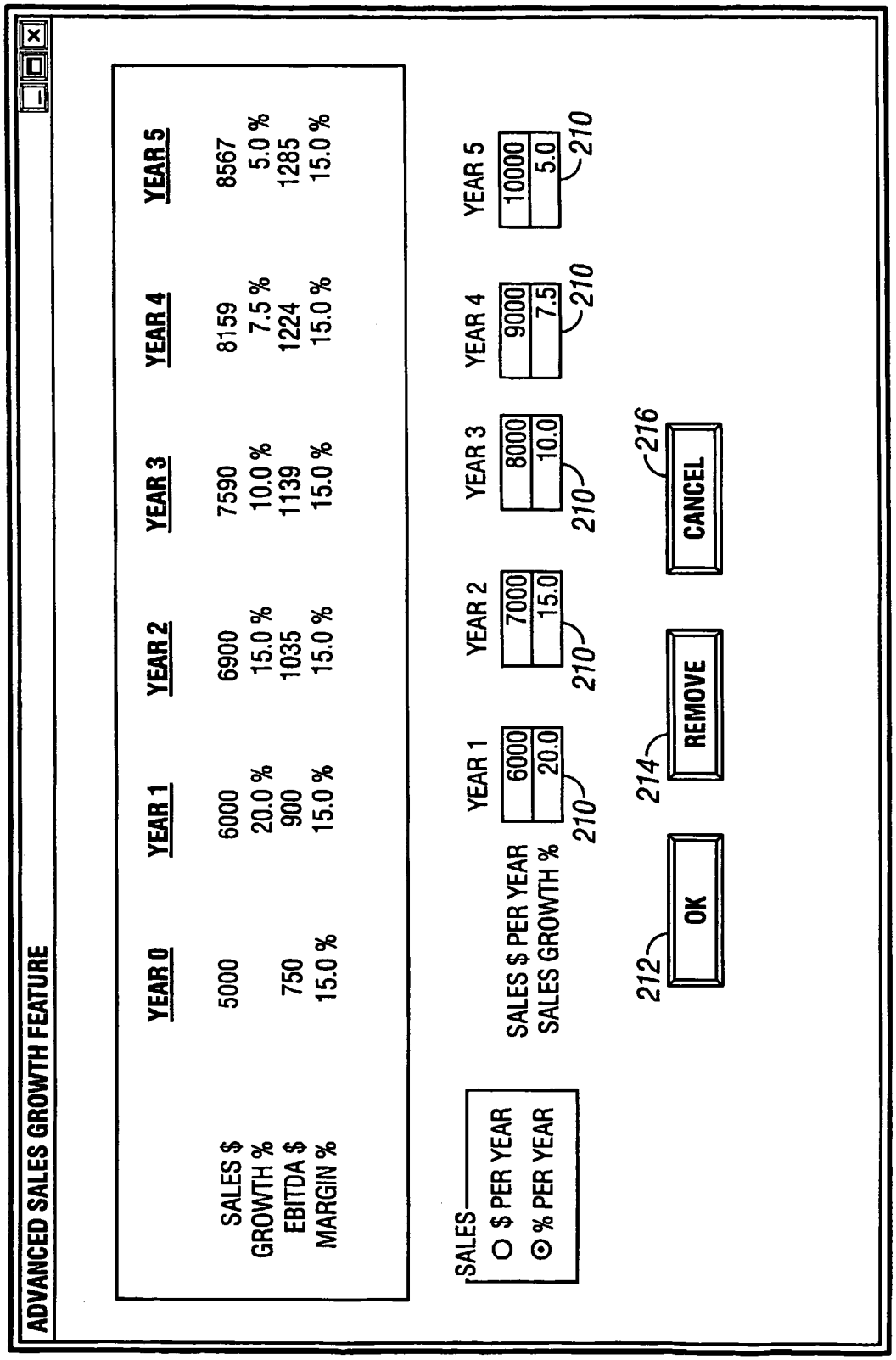

Turning to FIGS. 5, 12 Although to calculate an output data set, the system only requires the user enter values into the cells comprising the input data set elements in the Best Value Mode and requires the user to enter an input data set and value set in the Interactive Mode, the user may enter additional data in the Advanced Features cells. The user prompts the processor to enable the Advanced Features cells by clicking on the Advanced Features option found in the "Tools" 204 drop down menu on the valuation template. To deactivate all Advanced Feature cells, the user clicks on the Advanced Features option a second time.

Enabled Advanced Features cells are marked with a square button with an "A" inside. Clicking the "A" icon associated with the following input data set element cells prompts the system to display new pop-up screens; Sales Growth and EBITDA Growth 116, EBITDA Synergy 120, Capital Expenditure 118, Accounts Receivable 96, Inventory 100, Accounts Payable 108, Additional Equity 206, and Real Estate 208. Referring to FIG. 12 as an example of a pop-up screen, the user enters values into the cells 210 on the pop-up screen and clicks on the "Okay" icon 212 to activate the advanced feature and close the pop-up screen. To deactivate the Advanced Feature, the user clicks on the "A" icon on the valuation template to retrieve the pop-up screen and clicks on the "Cancel" 216 icon to deactivate the advanced feature.

In the EBITDA Growth advanced feature cells, the user selects "$/yr" to enter the EBITDA sales for a 5-year period or "percent/yr" to enter the percent EBITDA margin for the 5 years. When active, this Advanced Feature overrides the Sales & EBITDA Growth cell 110 (FIG. 4). In the EBITDA Growth cell, the user selects "$/yr" to enter actual EBITDA for the 5 years or selects "percent/yr" to enter percent growth in EBITDA for the 5 years. When active, this Advanced Feature overrides EBITDA Synergy cell.

The user enters actual capital expenditure for the 5 years in the Capital Expenditure advanced feature cell to override the Capital Expenditure cell in the input data set 110 (FIG. 4). In the Accounts Receivable advanced feature cell the user selects "$/yr" to enter actual A/R for the 5 years or selects "# Of Days" to enter A/R in terms of the number of days outstanding for the 5 years. When active this feature overrides the A/R cell 94 (FIG. 4). The user selects either "$/yr" to enter actual Inventory for the 5 years or selects "Inventory Turns" to enter inventory turnover for the 5 years in the Advanced Feature: Inventory advanced feature cell. This feature, when active, overrides the Inventory cell 98 (FIG. 4).

In the Accounts Payable advanced feature cell the user selects "$/yr" to enter actual A/P for the 5 years or selects "# Of Days" to enter A/P in terms of number of days outstanding for the 5 years. When active, this feature overrides the A/P cell 104 (FIG. 4).

In the Additional Equity advanced feature cell, the user enters either "Unlimited" or the actual additional equity, in dollars, that the Buyer is willing to infuse in future years. The system normally assumes when this Advanced Feature is inactive that the Buyer wants to establish a Purchase Price for the business that does not require infusion of additional capital into the business after the acquisition. The Additional Equity feature enables the user to override the system assumption by enabling the System Cash Flow to become negative up to the amount of available additional equity. This feature enables the system to become an effective tool in valuing turn around and start-up businesses because these businesses will often times have a negative cash flow in the early years. This feature is also useful to value high growth businesses where working capital requirements can not be supported by internally generated cash and additional bank borrowing.

Although the system does not calculate or find Real Estate value, it can calculate a Real Estate income statement, balance sheet and cash flow when the Real Estate Advanced Feature is enabled 208. When enabled, the user enters the Real Estate price, the amount of bank loan as percent of the Real Estate Price, the interest cost, the loan amortization period, and the depreciation life of the property into the Real Estate cells in a pop-up screen.

The user activates the Over Advance Loan 218, Gap (Seller) Note: Principal Deferred 220, Gap (Seller) Balloon Note 222, and Mezzanine Financing 180 Advanced Features cells by clicking on the appropriate A icon and deactivates these cells by clicking on the A icon a second time. The Over Advance Loan Advanced Feature 218 provides the user with cells to enter the Loan Amount, Interest Cost and the Term of the loan in number of years. This feature allows the user to enter a second term loan. It is treated in the same way as the main term loan entered in the Financing Inputs, except, if there is excess cash flow, this loan gets paid off first. The Over Advance Loan feature is useful to enter air ball financing, second senior loan, a separate seller note etc. The system amortizes the Over Advance Loan input data in uniform annual principal payments over the term of the Note beginning with the first year post-acquisition. If zero is entered for the number of years, the system treats this loan as a balloon note and pays it off at the end of 5 years.

The user enters the number of years by which the principal payments on the Gap (Seller) Note can be deferred in the Gap (Seller) Note: Principal Deferred cells 220. The entry is an integer number between 1 to 4 years. 1-year deferral means that the principal payment on Gap (Seller) Note will begin in the $2^{nd}$ year and 4-years deferral means that the principal payments will begin in the $5^{th}$ year. The system pays off the loan in equal annual payments beginning after the deferral period.

In the Gap (Seller) Balloon Note cells 222, the user enters the Amount, Interest Cost and the year in which the Balloon Note is due. The user must enter an integer number between 1 and 5. This note is in addition to the Gap (Seller) Note in the Deal Structure Inputs section.

In the Mezzanine Financing cells 224, the user enters the mezzanine loan amount, the associated interest cost, the number of years over which the loan has to be paid off, and the expected ROI by the mezzanine lender. The system amortizes the Mezzanine loan in uniform annual principal payments over the term of the Note beginning with the first year post-acquisition. If the user enters "0" the number of years, the system treats this loan as a balloon note and pays it off at the end of 5 years.

The Mezzanine Equity cell is an input cell for the user and an output cell for the system. When the system runs in Best Value Mode (FIG. 1), no entry is required to find a optimized value set. When the user clicks on the Best Value icon 136, the system outputs into this cell the Mezzanine Equity to satisfy mezzanine lender's ROI expectation. Any previous information in this cell is overridden. In the Interactive Mode, the user manually inputs Mezzanine Equity. The permitted Mezzanine Equity range is from zero to 90 percent. Clicking the Mezzanine Equity 224 icon prompts the system to calculate Mezzanine Equity and adjust Buyer's actual ROI, but does not change other variables, such as the Purchase Price.

I claim:

1. A method of valuing a business entity with a processor comprising:

inputting, into a processor input device
        (1) prior income statement information for the business entity and prior balance sheet information for the business entity,
        (2) forecast of sales, profitability, capital expenditure and working capital,
        (3) expected return on invested equity, and
        (4) expected willingness of one or more lenders to provide acquisition debt capital, its cost and repayment terms;
    assuming in the processor an initial business entity value and invested equity;
    determining, in the processor, projected income statement information, projected balance sheet information, and projected cash flow information for the business entity;
    determining, in the processor, return on invested equity and investor's cash flow after debt service;
    iteratively calculating in the processor a plurality of return on invested equity and investor's cash flow after debt service and converging on the maximum business entity value and minimum invested equity value based on
        (1) said expected return on invested equity,
        (2) said expected willingness of lender(s) to provide acquisition debt capital, its cost and repayment terms, and
        (3) selected minimum levels of projected cash flow after debt service, capital expenditure and working capital for the business entity,
    by iteratively changing one or both of
        (a) the invested equity, and
        (b) the business entity value; and
    displaying on a display device
        (1) the calculated maximum business entity valuation and
        (2) the calculated minimum invested equity associated with said calculated maximum business entity valuation.

2. The method of claim 1 wherein the processor automatically performs the step of iteratively adjusting the business entity values and buyer's invested equity.

\* \* \* \* \*